UNITED STATES PATENT OFFICE.

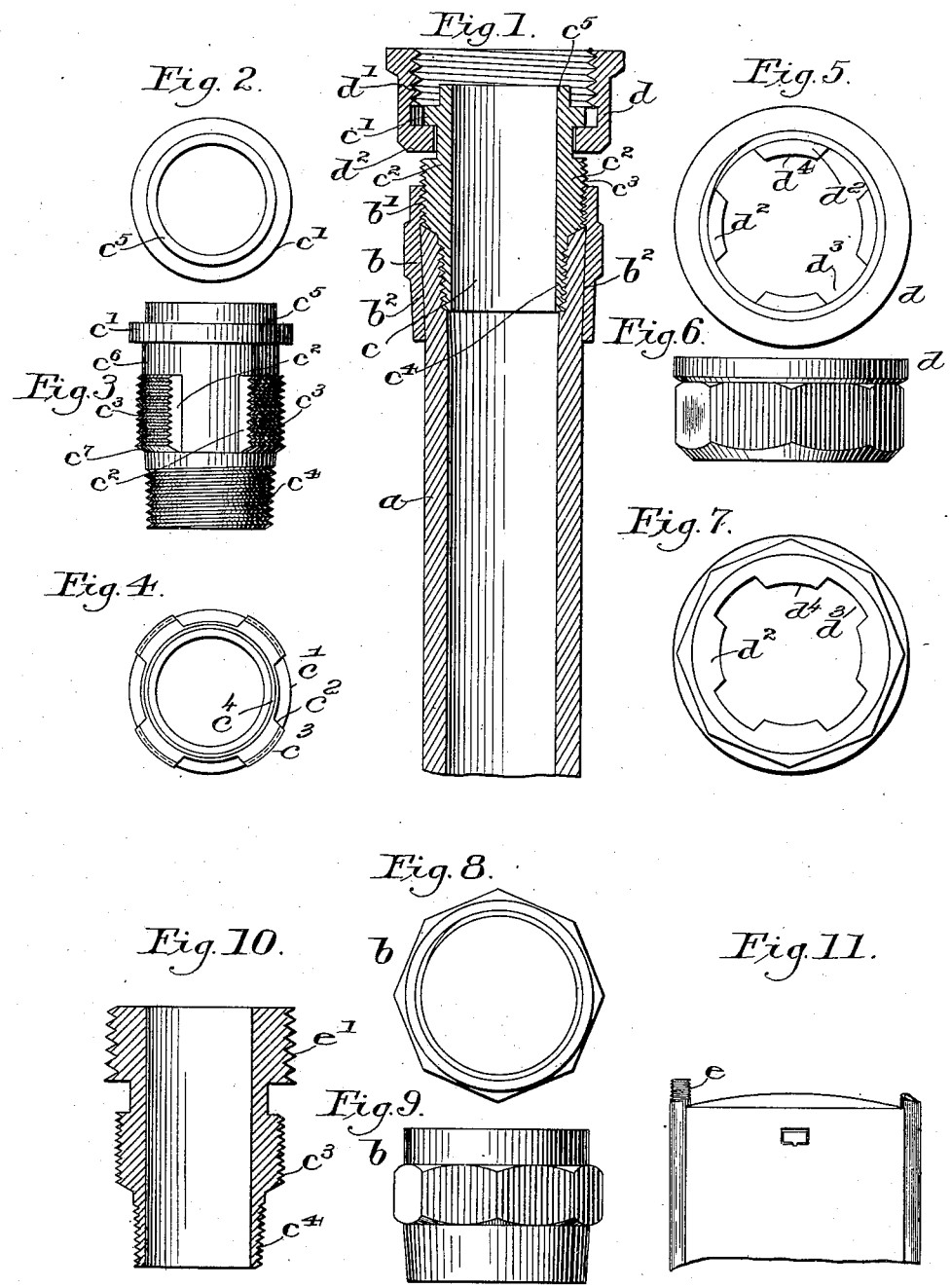

CHARLES LUKE, OF MILFORD, CONNECTICUT, ASSIGNOR, BY MESNE ASSIGNMENTS, TO THE NEW HAVEN NOVELTY MACHINE COMPANY, OF NEW HAVEN, CONNECTICUT.

PIPE COUPLING OR CONNECTION.

SPECIFICATION forming part of Letters Patent No. 633,324, dated September 19, 1899.

Application filed October 29, 1898. Serial No. 694,872. (No model.)

*To all whom it may concern:*

Be it known that I, CHARLES LUKE, of Milford, county of New Haven, State of Connecticut, have invented an Improvement in Pipe Couplings or Connections, of which the following description, in connection with the accompanying drawings, is a specification, like letters on the drawings representing like parts.

This invention has for its object the production of a novel pipe coupling or connection, it being more especially adapted for use in connection with lead pipes, but it may be used with other ductile or metal pipes.

Heretofore in the use of lead pipe in connection with gas-meters, washbowls, closets, bath-tubs, pumps, sinks, and other places where lead pipe is commonly used to afford a passage-way for gas, water, or other fluids it has been common to insert into the end of the lead pipe a metallic collar, which is secured therein by soft or other solder, and a joint so made is finished exteriorly to constitute what is called a "wipe-joint." I have devised a coupling or connection for lead pipe which may be quickly and easily applied by any one without the employment of solder or skilled labor.

One part of my coupling consists of a collar adapted to be applied to the exterior of the lead or other ductile pipe at one end thereof, said collar having preferably interior threads or projections near one end, the end of the pipe meeting substantially the inner end of the threaded part of the collar, the other part of my coupling consisting of a hollow plug presenting external screw-threaded portions of different diameter, the end of the plug of smaller diameter being tapered, the threads on the plug being substantially all of the same pitch. Having applied the collar to the end of the pipe and put said end against the inner end of the screw-threaded part of the collar I insert the tapered end of the plug in the collar and enter the same in the open end of the pipe, and in this position the threaded part of the plug of greater diameter engages the threaded part of the collar, and as the plug is rotated to screw it into the collar the threaded tapered end of the plug, its threads being of the same pitch as the part of the plug in engagement with the screw-threads of the collar, cuts its way into the interior of the pipe, making a matching thread.

Were it not for the fact that the screw-threads on the plug were of substantially the same pitch it will be seen that the entrance of the tapered screw-threaded end of the plug into the pipe would strip from the interior of the lead pipe a portion thereof and would not make a well-defined screw-thread in which the screw-threads of the plug might enter and fit, making a substantially gas and fluid tight joint.

The threaded part of the plug of greatest diameter is provided with a series of longitudinal slots, thus separating that threaded part into a series of threaded projections, the threads of the projections engaging the interior threads of the collar.

The end of the plug most remote of the pipe has a radially-extended collar, and there is an annular space between the upper ends of the projections referred to and the under side of said collar, said space receiving loosely a threaded ring, it constituting a running screw connection capable of being screwed upon any usual stationary threaded projection, as of a gas-meter, washbowl, bath-tub, sink, pump, or to any other member of a coupling or other device or article into which to pass water or any other fluid. The running ring referred to has an inturned flange at one end, which has as many notches as there are spaces between the screw-threaded projections of the portion of the plug of greatest diameter or the portion of the plug which engages the screw-threads of the collar, said ring being put into position by sliding it onto the plug from its tapered end, the notches of the ring embracing and sliding over the projections referred to as the ring is put into working position to do its part in effecting the coupling or connection of the lead pipe attached to it with its coöperating male member. As the threaded projections are being screwed into the threads of the collar and the threaded end of the plug is cutting its way uniformly and making in the lead pipe a mating thread, it results that the ends of the threaded projections finally meet the end of the lead pipe and hammer or beat and smooth it down, turning the pipe somewhat outwardly, and the thread of the plug embeds itself firmly in the soft metal of the pipe, making simply by a mechanical action a gas and fluid tight joint. It will also be noticed that the hole through the plug is of substantially or nearly the full diameter of the interior of the lead pipe, so by the use of a coupling of the kind herein referred to it is possible to get a larger quantity of gas or fluid through the bore of the pipe than by the use of a coupling having a sleeve which enters the open end of the pipe and leaves the end of the sleeve to form an abutment or shoulder, decreasing the effective diameter of the inner bore of the pipe.

Figure 1 of the drawings represents in section a piece of lead pipe with the female part of my improved connection applied thereto. Figs. 2, 3, and 4 are respectively an upper end, a side elevation, and a lower end view of the hollow plug. Figs. 5, 6, and 7 are respectively an upper end, a side elevation, and a lower end view of the running ring. Figs. 8 and 9 are respectively an upper end view and a side elevation of the collar. Fig. 10 shows a hollow mating plug adapted to be used, if desired, in another piece of pipe—as, for instance, should it be desired to join two pieces of lead pipe. Fig. 11 shows a threaded projection, such as commonly extended from a gas-meter, to which the running ring may be readily attached.

The pipe $a$, of lead, or it may be of any other ductile metal, has applied to it externally near its end a collar $b$. The collar may have at its interior beyond the end of said pipe a screw-threaded portion $b'$, and the interior of this collar from the lower ends of the screwthread to its extremity may be somewhat tapered, as at $b^2$, Fig. 1, and coöperating with this collar and adapted to enter the pipe surrounded by the collar and clamp the pipe firmly is a plug C, provided at its inner end with a tapered screw-threaded portion $c^4$, and near the central part of the plug there is a portion $c^2$ of greater diameter, its thread being of substantially the same pitch as the thread on the portion $c^4$, the portion $c^2$ of larger diameter being herein shown as provided with a series of longitudinal slots to leave a series of projections, each threaded, as at $c^3$, the projections being terminated by shoulders $c^7$. The plug at one end of these projections has a smooth portion $c^6$, next which is a flange $c'$.

The plug $c$ has a projecting end $c^5$, on which in practice will be laid a packing-ring, it being used when the joint made by the coupling is effected. Surrounding the plug between the collar $c'$ and the projection $c^2$ is a loose or running ring $d$, it having internal screw-threads $d'$ and an inturned flange $d^2$, said flange (see Figs. 5 and 7) being cut away or notched, as at $d^3$, a notch for each projection $c^2$, the notches being substantially wide enough to enable the ring to be slipped over the threaded end of the plug and then over the projections and come into working position underneath the flange $c'$. The inner portions $d^4$ of the flange left at the sides of the said projections run on the part $c^6$ of the plug between the said flange and the ends of the projections $c^2$.

To combine operatively the parts so far described, the end of the pipe will be inserted in the collar up substantially to the lowermost round of threads $b'$ therein, and then the hollow plug having the loose running ring $d$ upon it will have its tapered end inserted into the open end of the collar, the end of the plug meeting the pipe, and the threaded portion $c^2$ of greatest diameter will have its screw-threads $c^3$ engaged with the threads $b'$ of the collar and the plug will be turned, the screwing of the threaded part of greatest diameter into the threaded part of the collar forcing the screw-threaded end $e^4$ of the plug into the end of the body, said threads cutting their way into the soft or ductile material of the pipe and making a preferred matching and mating thread, the plug somewhat expanding and stretching the pipe, so that the latter fits snugly the tapered interior $b^2$ of the collar $b$. As the hollow plug comes into its working position (represented in Fig. 1) the tapered ends of the projections $c^2$ meet one after the other the end of the pipe, and said projections act with a hammer-like effect to beat down and smooth the end of the pipe, and owing to the threads $c^3$ and $c^4$ being of substantially the same pitch truly-formed leaden threads are formed at the interior of the pipe.

It will be understood that if the threads $c^3$ and $c^4$ were of different pitch the screwthreads could not be formed at the interior of the lead pipe, but the lead would be stripped from the interior of the pipe as the threaded part of the plug was being screwed into it.

Fig. 11 shows a "threaded," so called, male member $e$, such as commonly attached to a gas-meter, it receiving the threads of the running ring $d$.

Fig. 10 shows a modified hollow mating plug C', having the threaded parts $c^4$ and $c^3$ to operate as described already of the parts $c^4$ and $e^3$ in Fig. 1, and beyond the projections having the threaded part $c^3$ there is a threaded male part $e'$. The hollow screwplug represented in Fig. 10 may be inserted as described of the plug $c$ in the end of a piece of pipe which it is desired to couple with the pipe $a$, and the running ring $d$ may be screwed readily upon the threaded portion $e'$, thus making an effective pipe-coupling.

From the foregoing description it will be understood that the plug $c$ is surrounded externally at two different points between its ends with screw-threads $c^4$ and $c^3$, said screwthreads being on parts of the plug of two different diameters, the part of the plug having the series of screw-threads $c^4$ being tapered toward the inner end of the plug, the screw-threads $c^3$ being on a part of the plug of larger diameter, so that there is left between said series of threads a shoulder $c^7$, which meets the extremity of the pipe, the tapered screw-threaded part expanding the pipe as it cuts its way into the same while the threaded part $c^3$ is being screwed into the threaded interior of the collar $b$. This collar is contracted at its interior toward its unthreaded end, so that the interior diameter of the unthreaded end of the collar is less than at the interior of the screw-threaded end thereof.

I believe that I am the first to provide a plug with a double series of screw-threads, said threads being located externally on parts of the plug of different diameter, one of said series of screw-threads—viz., the one entering the lead pipe—presenting a tapered exterior, so that said screw-threads gradually cut their way into the lead pipe and somewhat expand the same, the other series of screw-threads entering the screw-threaded part of a surrounded collar, and so, also, I am the first to employ a double set of screw-threads of the same pitch on the exterior of a coupling made as a plug, one of said threads entering an exterior collar, the other cutting its way into the interior of the pipe which is to be clamped and held at its end firmly between the plug and said exterior collar.

Having described my invention, what I claim as new, and desire to secure by Letters Patent, is—

1. In a pipe coupling or connection, a collar having a screw-thread, a hollow plug having at one end a screw-threaded portion and beyond said threaded portion a series of threaded projections and an annular flange, the end of the threaded portion entering the open end of the pipe, the thread of the threaded projection engaging the screw-threads of the collar, and a running ring coöperating with the threaded plug behind said flange, substantially as described.

2. In a pipe coupling or connection, a threaded running ring, an outside collar having an interior screw-thread at or near one end and tapered internally from the said screw-thread toward its opposite end, a hollow plug having at one end a screw-threaded portion, and beyond said threaded portion a series of threaded projections, and an annular flange, the end of the threaded portion entering the open end of the pipe, the threads of the threaded projections engaging the screw-thread of the collar, said ring running on said plug behind said flange, substantially as described.

3. In a pipe coupling or connection, a collar having a screw-thread, a hollow plug having at one end a screw-threaded portion and next thereto a series of threaded projections, and beyond said projections a flange, and a threaded ring having notches and applied to said hollow plug, the notches of the ring sliding over the said projections in coming into position against said flange, the threads of the projections entering the threads of the collar while the threaded portion of the end of the plug cuts its way into the interior of the pipe, substantially as described.

4. In a coupling for lead pipe, an external collar provided at one end with an interior screw-thread, the interior of said collar being tapered from said screw-thread to its opposite end, and a hollow plug provided with two sets of external screw-threads of substantially the same pitch made on parts of said plug of different diameter, the endmost series of screw-threads being on the part of said hub of least diameter said part being tapered, the thread being adapted to cut its way into the interior of the lead pipe, the plug having a shoulder between the two series of screw-threads to contact with the end of the pipe, the screw-threads of greatest diameter entering the screw-threads of the collar, substantially as described.

5. In a coupling for lead pipe, an external collar provided at one end with an interior screw-thread, the interior of said collar being tapered from said screw-thread to its opposite end, and a hollow plug provided with two sets of screw-threads of substantially the same pitch, one made on a tapering part of said plug and the other on a cylindrical part of said plug, the threaded cylindrical part of plug being of greater diameter than the threaded part of the plug, a shoulder being left between the said two series of screw-threads to abut against the end of the pipe when the tapered threads are screwed into the pipe and the cylindrical threads are screwed into threads of the surrounding collar, substantially as described.

In testimony whereof I have signed my name to this specification in the presence of two subscribing witnesses.

CHARLES LUKE.

Witnesses:
HENRY G. THOMPSON,
D. C. SMYTH.